(12) United States Patent
Clark et al.

(10) Patent No.: US 6,420,443 B1
(45) Date of Patent: Jul. 16, 2002

(54) ADDITIVES FOR ENHANCED HYDROCARBON COMPATIBILITY IN RIGID POLYURETHANE FOAM SYSTEMS

(75) Inventors: R. Christopher Clark, Charleston; Brian L. Hilker, Winfield, both of WV (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/393,172

(22) Filed: Sep. 9, 1999

(51) Int. Cl.[7] .............................. C08J 9/14; C08K 5/06; C08K 5/10; C08K 5/01

(52) U.S. Cl. ............... 521/114; 252/182.2; 252/182.24; 252/182.28; 252/182.29; 521/115; 521/116; 521/130; 521/131; 521/170; 521/172; 521/173; 521/174; 521/176

(58) Field of Search ............................. 521/114, 116, 521/130, 131, 170, 172, 173, 174, 176, 115; 252/182.2, 182.24, 182.28, 182.29

(56) References Cited

U.S. PATENT DOCUMENTS

| | | | |
|---|---|---|---|
| 4,365,024 A | * 12/1982 | Frentzel | 521/114 |
| 4,529,745 A | 7/1985 | Londrigan | 521/137 |
| 4,751,251 A | 6/1988 | Thornsberry | 521/112 |
| 5,336,696 A | 8/1994 | Ashida | 521/113 |
| 5,451,615 A | 9/1995 | Birch | 521/132 |
| 5,464,562 A | 11/1995 | Patterson | 252/182.28 |
| 5,470,501 A | 11/1995 | Fishback et al. | 252/182.28 |
| 5,484,817 A | 1/1996 | Patterson | 521/116 |
| 5,504,125 A | 4/1996 | Fishback et al. | 521/115 |
| 5,578,651 A | 11/1996 | Lamberts et al. | 521/107 |
| 5,684,092 A | 11/1997 | Seifert et al. | 252/350 |
| 5,688,989 A | * 11/1997 | Daute et al. | 560/26 |
| 5,736,588 A | 4/1998 | Eisen et al. | 521/155 |
| 5,786,400 A | 7/1998 | Brock et al. | 521/117 |
| 5,856,679 A | 1/1999 | Barthelemy et al. | 252/182.24 |
| 5,886,062 A | 3/1999 | Dietrich et al. | 521/167 |

FOREIGN PATENT DOCUMENTS

| | | |
|---|---|---|
| WO | 96/12759 | 5/1996 |
| WO | 98/42764 | 10/1998 |

* cited by examiner

*Primary Examiner*—Rabon Sergent
(74) *Attorney, Agent, or Firm*—Michael P. Dilworth

(57) ABSTRACT

A process for preparing hydrocarbon blown rigid polyurethane foam using a novel compatibilizing agent. The compatibilizing agent is an alkoxylate adduct of a triglyceride with a hydroxyl value of about 100 or less. The triglyceride adduct has an ethylene oxide content of at least 40% by weight thereof. These adducts may be used alone or in mixture with other compatibilizers. The compatibilizers increase the stability of rigid foam formulation emulsions containing greatly increased hydrocarbon blowing agent levels while showing little or no adverse affect to physical properties of foams prepared therewith.

19 Claims, No Drawings

US 6,420,443 B1

ADDITIVES FOR ENHANCED HYDROCARBON COMPATIBILITY IN RIGID POLYURETHANE FOAM SYSTEMS

BACKGROUND OF THE INVENTION

This invention relates to a process for preparing hydrocarbon blown, rigid polyurethane foam using a novel compatibilizing agent.

Many of today's rigid foam formulations have been optimized for desirable processing and property characteristics using such common blowing agents as F-11 and HCFC-141b. Due to environmental concerns and associated legislative pressures, these and similar materials are being phased out over varying timetables in different countries. These market changes have created a need for alternative blowing agents for rigid foam applications. One of these potential alternatives involves the use of hydrocarbon blowing agents, such as isomers of pentanes and butanes, in place of the widely used and historical chlorofluorocarbons (CFC's), hydrochlorofluorocarbons (HCFC's), and hydrofluorocarbons (HFC's). Unfortunately, these low polarity hydrocarbon blowing agents frequently possess limited compatibility with standard foam formulations optimized for the halogenated additives. Accordingly in the near term, the industry urgently needs additives that will improve the compatibility of these new blowing agents with the time-proven processing equipment and formulation chemistries. In time, evolving chemistries and/or manufacturing processes may obviate this compatibilizer need, but the industry needs tractable solutions today to meet current environmental and market demands.

Much art exists in the rigid polyurethane foam field detailing additives that render hydrocarbons more compatible with standard rigid foam formulation mixtures. This specific invention addresses additional novel additives and mixtures of additives that render hydrocarbon blowing agents more compatible with rigid foam formulations, possibly resulting in density reduction and more efficient use of the blowing agent.

WO 96/12759 (Dow) discloses a close-celled polyurethane foam comprising reacting in the presence of a hydrocarbon blowing agent, a polyisocyanate with a mixed polyol composition. This polyol mixture comprises a standard rigid polyol plus a compatibilizing agent containing the $C_nH_{2n+1}$ fragment, where n is greater than or equal to 5, which contains at least one active hydrogen and not more than one aromatic group. Castor oil is illustrated. The compatibilizing agents may be alkoxylated derivatives of fatty oils. No criticality for alkoxylation is noted and, more particularly no criticality of ethoxylation is suggested. U.S. Pat. No. 5,451,615 (Dow), a related patent, details compatibilizing agents which are fatty oils with hydroxyl values of 100–200.

U.S. Pat. No. 5,484,817 and U.S. Pat. No. 5,464,562 describe a method for preparing close-celled rigid polyisocyanate foam comprising reacting polyisocyanate and polyol having ester linkages with a $C_4$–$C_7$ hydrocarbon and a polyol additive. This additive is noted as a polyalkylene polyether monol (i.e. a mono hydroxy compound) based on a $C_8$–$C_{24}$ fatty hydrocarbon with one active hydrogen atom.

U.S. Pat. No. 5,470,501 and U.S. Pat. No. 5,504,125 describe polyurethane foam formulations using a hydrocarbon $C_4$–$C_7$ blowing agent and a compatibilizer. The noted compatibilizer is an optionally alkoxylated alkyl aromatic monol or derivative.

WO 98/42764 (ICI) discusses use of a mixture of two different polyoxyethylene polyether monols to solubilize hydrocarbon blowing agents in rigid polyurethane foams. $C_{12}$–$C_{15}$ monols with 120–180 hydroxyl values are discussed as solubilizing agents.

Skowronski and Londrigan, (Jim Walter Research Corp.) SPI $29^{th}$ Polyurethane Conference, 1985 page 76–83 describes foams based on surfactants prepared from castor oil ethoxylates unto which were grafted maleate and fumarate esters via free radical coupling chemistries. These surfactants were reportedly used in phenolic closed celled foams as well as polyurethane foams and were substitutes for traditional silicone surfactants. A related patent, U.S. Pat. No. 4,529,745 describes surfactants which are free radical reaction products of polyoxyalkylene adducts of organic triglycerides with dibasic esters that possess unsaturated $C_4$–$C_5$ diacid cores and $C_8$–$C_{18}$ alcohol derived tails. Ethoxylated castor oil and tridecyl fumarate are preferred building blocks of these grafted surfactants.

U.S. Pat. No. 5,684,092 describes polyurethane foams employing hydrocarbon blowing agents and a 1–4 carbon monol other than t-butanol.

U.S. Pat. No. 5,786,400 (Sumitomo Bayer Urethane Co., Ltd.: Japan) describes the use of t-butanol as a hydrocarbon emulsifier in rigid foams. Data in Table 3 of the citation shows it to be more efficient compatibilizer than a nonylphenol ethoxylate additive or no additive.

U.S. Pat. No. 4,751,251 (Dow Corning) describes a blend of silicone, organic surfactant and water or $C_1$ to $C_3$ alcohols as a generic compatibilizer package. The document claims no negative effect is produced on foam reaction catalysis, even with acid functional organic surfactant, and observes increased foam height when using these mixtures. The preferred organic surfactant is reported to be sodium dodecylbenzene sulfonate.

U.S. Pat. No. 5,736,588 (Bayer Aktiengesellschaft) uses solution promoters of a group consisting of dialkyl carbonates, certain dicarboxylic acid esters, certain triesters of phosphoric acid, certain fatty acid/diamine reaction products, and certain quartemary ammonium salts. U.S. Pat. No. 5,578,651 describes similar solubilizers used in polyurethane foams employing halohydrocarbon blowing agents.

SUMMARY OF THE INVENTION

This invention relates to rigid foam mixtures comprised of polyol(s), isocyanate(s), blowing agent(s), catalyst(s), optional additive(s), and specific compatibilizing additives. The invention further relates to a novel process for preparing hydrocarbon blown rigid polyurethane foam using a compatibilizing agent.

The compatibilizing agent utilized in the invention is (1) an alkoxylate adduct of a triglyceride with a hydroxyl value of less than about 100. The triglyceride adduct (1) has an ethylene oxide content of at least 40% by weight of the adduct. These adducts may be used alone or in mixtures with other compatibilizers. The compatibilizers increase the stability of rigid foam formulation emulsions containing hydrocarbon blowing agents while showing little or no adverse affect to physical properties of foams prepared therewith.

The alkoxylated triglyceride additive (1) may optionally be employed with one or more adducts (2) from the following: a polyoxyalkylene oxide monol, a capped polyoxyalkylene oxide adduct, and a fatty oil, including triglyceride(s) or alkoxylated triglyceride(s), other than those defined for triglyceride adduct (1).

Another aspect of the present invention is the polyurethane foam/article made by curing a composition of the invention.

DETAILED DESCRIPTION OF THE INVENTION

The entire disclosures of all US patents and other published documents and any copending US patent applications mentioned anywhere herein are expressly incorporated herein by reference This invention relates to rigid foam mixtures comprised of polyol(s), isocyanate(s), blowing agent(s), catalyst(s), optional additive(s), and the compatibilizing additive of the invention. The compatibilizing agent(s) of this invention greatly enhance the stability of rigid foam formulation emulsions, particularly when prepared with higher hydrocarbon blowing agent levels. Compatibility improvements of 15% or more, as measured by an ability to relatively increase hydrocarbon levels without breaking the emulsion, can generally be obtained with the invention, often greater than 50%. In preferred embodiments of the invention the foam system can tolerate increased hydrocarbon levels which are 75% more higher than levels obtainable with conventional compatibilizers.

Rigid foam as discussed in this invention is one defined by its application. It is typically a fine, closed-cell foam material with ample bulk physical integrity and self-supporting character such as to be used as laminated building panels structural components in appliances, etc. This foam also often must possess high thermal resistance and high insulation properties with only a relatively slow increase in thermal conductivity over time. It may also be required to be low in friability, high in compressive strengths, and have low flammability.

The polyols used in the foam mixtures are compounds having two or more hydroxyl groups. They generally have a molecular weight between 50 and 12,000, more narrowly from about 200 to about 1,000. They may be polyether polyols, polyester polyols or other polyol compounds. Mixtures of polyols of various structures, molecular weights and/or functionalities may also be used.

The polyols which can be employed in the preparation of these foam compositions include, for example, monomeric polyols such as ethylene glycol, 1,2-propylene glycol, 1,3-propylene glycol, 1,2-butanediol, 1,4-butanediol, hexanetriol, glycerol, trimethylolpropane, triethylolpropane, pentaerythritol, sorbitol, mannitol, sucrose, and bisphenol A; polyethers such as polyethylene ether glycols, polypropylene ether glycols, polytetramethylene ether glycols, and alkylene oxide adducts of polyhydric alcohols, including those monomeric polyols listed above and wherein the oxyalkylene portion is derived from a monomeric unit such as ethylene oxide, propylene oxide, butylene oxide, tetrahydrofuran, or mixtures thereof; hydroxyl terminated amines and alkoxylated adducts thereof; and alkylene oxide adducts of acids of phosphorous such as the adducts prepared by the reaction of phosphoric acid and ethylene oxide, phosphoric acid and propylene oxide, phosphorus acid and propylene oxide, phosphonic acid and ethylene oxide, phosphonic acid and propylene oxide, polyphosphoric acid and propylene oxide and phosphonic acid and styrene oxide.

Typical polyether polyols include polyoxyethylene glycol, polyoxypropylene glycol, polyoxybutylene glycol, polytetramethylene glycol, block copolymers, for example, combinations of polyoxyethylene glycol and polyoxypropylene glycol, poly-1,2-oxybutylene and oxyethylene glycols, and poly-1,4-oxybutylene and oxyethylene glycols, and random copolymer glycols prepared from blends or sequential addition of two or more alkylene oxides. Also adducts of the above with trimethylolpropane, glycerol, and hexanetriol as well as the polyoxypropylene adducts of higher polyols such as pentaerythritol, and sugar derivatives such as mannitol, sucrose sorbitol, and the like, may be employed. Alkoxylated bisphenols or polyphenols can also be used.

The polyol ether polymers which can be employed in the present invention include oxyalkylene polymers which have an oxygen/carbon ratio from about 1:2 to 1:4 and preferably an oxygen/carbon atom ratio from about 1:2.8 to 1:4 and from 2 to 6 terminal hydroxyl groups, preferably an average of about 2–4 terminal hydroxyl groups. The polyether polyols generally have an average equivalent weight from about 60–10,000 and preferably have an average equivalent weight from about 70–6,000, more preferably about 1,000 or less. Polyoxypropylene polyols having molecular weights from about 200 to 4000 corresponding to equivalent weights from about 70 to 400 and mixtures thereof are particularly useful as polyol reactants. Polyol blends such as mixtures of high molecular weight polyether polyols with lower molecular weight polyether polyols or monomeric polyols can also be employed.

Any suitable hydroxyl terminated polyester may also be used. These can be obtained from the reaction of polycarboxylic acids and/or esters and polyhydric alcohols. Such suitable polycarboxylic acids may include oxalic acid, malonic acid, succinic acid, glutaric acid, adipic acid, pimelic acid, suberic acid, azelaic acid, sebacic acid, basillic acid, thapsic acid, maleic acid, fumaric acid, glutaconic acid, ortho-phthalic acid, isophthalic acid, and terephthalic acid. Suitable polyhydric alcohols include the following: ethylene glycol, 1,2-propylene glycol, 1,3-propylene glycol, 1,2-butylene glycol, 1,3-butylene glycol, 1,4-butylene glycol, 1,3-pentanediol, 1,4-pentanediol, 1,5-pentanediol, 1,6-hexanediol, 1,5-hexanediol, glycerol, trimethylolpropane, trimethylolethane, hexane-1,2,6-triol, α-methylglucoside, pentaerythritol, sorbitol, sucrose, and compounds derived from phenols such as 2,2-bis(4-hydroxyphenol) propane. Polyesters based on mixed acids and/or polyols may also be used. Polyester functionality typically spans from about 1.5 to 8 more preferably from about 1.8 to 4. Hydroxyl numbers typically range from about 100–600 (including residual diols) and more preferably from about 150–350 for these polyols. Mixtures of polyether and polyester polyols may also be employed within this invention.

In addition to the above hydroxyl-containing compounds, other compounds, which may be employed, include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

Any organic isocyanates can be employed in the preparation of foams of the present invention. The organic polyisocyanates, which can be used, include aromatic, aliphatic, and cycloaliphatic polyisocyanates and combinations thereof. Representative of these types are the diisocyanates such as m-phenylene diisocyanate, toluene-2,4-diisocyanate, toluene-2,6-diisocyanate, mixtures of the 2,4- and 2,6-toluene diisocyanates, hexamethylene-1,6-diisocyanate, tetramethylene-1,4-diisocyanate, cyclohexane-1,4-diisocyanate, hexahydrotoluene 2,4- and 2,6-diisocyanates, naphthalene-1,5-diisocyanate, diphenyl methane-4,4'-diisocyanate, 4,4'-diphenylene diisocyanate, polymethylenepolyphenyl isocyanate, isophorone diisocyanate, dicyclohexylmethane-4,4'-diisocyanate, and various liquid diphenylmethane-diisocyanates containing a mixture of 2,4- and 4,4' isomers. Especially useful are polymethylenepolyphenyl isocyanates. These isocyanates are prepared by conventional methods known in the art such as phosgenation of the corresponding organic amines. Crude polyisocyanates may also be used in the practice of this invention, such as crude toluene diisocyanate obtained by the phosgenation of a mixture of toluene diamines or the crude diphenylmethane diisocyanate obtained from the phosgenation of a mixture of crude methylene diphenylamines. Mixtures of any of these may be employed.

The amount of polyisocyanate present when preparing the polyurethane foams is such to provide for an isocyanate index of typically from about 60 to 350, preferably from around 80 to about 200. An isocyanate index of 100 corresponds to one isocyanate group per isocyanate reactive hydrogen atom present including those from the polyol composition, compatibilizing agent, and, if present, any water.

The polyurethane foaming process of this invention requires the presence of a hydrocarbon blowing agent that advantageously comprise a $C_4$–$C_8$ aliphatic or cycloaliphatic hydrocarbon being an alkane, alkene, or alkyne. Such hydrocarbons are selected as blowing agents because they have a boiling point lower than the reaction exotherm, generally more than about 120° C., and usually from about 150° C. to about 200° C., encountered when preparing polyurethane foam. Suitable hydrocarbons include those having boiling points of less than 120° C., and preferably less than 100° C., and more preferably less than about 50° C. Examples include i-butane, n-butane, n-pentane, i-pentane, cyclopentane, methylcyclopentane, hexane, cyclohexane, methylcyclohexane, isomers thereof, or mixtures of two or more thereof. Typically the hydrocarbon will be present in an amount of from about 1 to about 30 parts per 100 parts by total weight of polyol, though higher levels are highly desirable if they can be rendered compatible with the foam mixtures.

A supplemental blowing agent, water, may also be present. When present it is typically used in the amount from about 0.5–6 parts per 100 parts by weight of polyol. It is also possible to use conventional halogen-containing blowing agents and/or inert gases, e.g. $CO_2$, as supplemental physical blowing agents.

Optionally, other ingredients may be present when preparing polyurethane foam. Among these are catalysts, surfactants, colorants, antioxidants, reinforcing agents, fillers, antistatic agents, and flame retardants. Suitable flame retardants include phosphorous containing substances such as tris (chloroalkyl) phosphate and trisalkylphosphates, for example triethylphosphate and nitrogen substances such as melamine.

One or more catalysts for the reaction of the active hydrogen-containing compound with the polyisocyanate are advantageously present. Suitable catalysts include tertiary amine compounds and organometallic compounds. Exemplary tertiary amine catalysts include triethylenediamine, pentamethyldiethylenetriamine, N,N-dimethylcyclohexylamine, N-ethylmorpholine, N-cocomorpholine, N-methylmorpholine, tetramethylethylenediamine, dimethylbenzylamine, 1-methyl-4-dimethylaminoethylpiperazine, 3-methyoxy-N-dimethylpropylamine, diethylethanolamine, N,N-dimethyl-N',N'-dimethylisopropylpropylenediamine, N,N-diethyl-3-diethylaminopropylamine, and the like. Exemplary organometallic catalysts include organomercury, organolead, organoferric and organotin catalysts, with organotin catalyst being preferred among these. Suitable tin catalyst include stannous chloride, tin salts of carboxylic acids such as stannous octoate and stannous acetate, and dibutyltin di-2-ethylhexanoate, dibutyltin dilaurate and dibutyltin acetate, as well as the other organometallic compounds such as are disclosed in U.S. Pat. No. 2,846,408. A catalyst for the trimerization of polyisocyanate and formation of polyisocyanurate polymers, such as an alkali metal alkoxide, alkyl metal carboxylate or quaternary amine compound, may also optionally be employed herein. When employed, the quantity of catalyst used is sufficient to increase the rate of the polymerization reaction. Precise quantities must be determined experimentally, but generally will range from about 0.01 to about 3.0 parts by weight per 100 parts polyol depending on the type and activity of the catalyst.

This invention may also include the use of minor amounts of surfactant. Such surfactants, distinguished from the natural fatty oil based materials, are typically organosilicone surfactants. Such surfactants are employed in amounts sufficient to stabilize the foaming mixture against collapse and the formation of large, uneven cells. Typically from about 0.1–3.0 parts of surfactant per 100 parts by weight of polyol are sufficient for this purpose. Silicone surfactants for polyurethane foam manufacture typically are materials having siloxane backbones with polyether pendant groups, see for example, U.S. Pat. No. 3,842,112 and U.S. Pat. No. 3,933,695. Examples of such surfactants include Niax® L-6900 and Niax® L-5420 available from CK Witco Corp.

The compatibilizing agents of this invention are additives are alkoxylated triglyceride adducts (1) with a hydroxyl value of about 100 or less. The hydroxyl value is defined in units of mg KOH per gram of sample as measured according the ASTM standard method D-4274 or related methods. These compatibilizing agents may be optionally employed with one or more adduct species (2) from the following: a polyoxyalkylene oxide monol, a capped polyoxyalkylene oxide monol or polyol adduct or a fatty oil including triglyceride(s) and alkoxylated triglyceride(s).

The alkoxylated triglyceride adducts (1) used in the invention refers to all ethylene oxide, propylene oxide, butylene oxide or tetrahydrofuran based reaction products of triglycerides wherein the ethylene oxide content of the adduct is at least 40 weight percent, preferably greater than 50 weight percent, and most preferably greater than 60 weight percent, such that this adduct possesses a hydroxyl number of about 100 or less, preferably less than 90, and most preferably about 75 or less. The term triglyceride refers to fats, fatty oils, and derivatives that are nominally tricarboxylic esters of glycerol and may involve identical or different ester moieties on the same molecule. The average chain length for each of the three carboxylate moieties of the triglyceride is suitably at least 6 carbon atoms long, preferably at least 8 carbon atoms long. Such triglycerides include, but are not limited to, oils such as linseed, perilla, tung, safflower, soybean, castor, coconut, and cottonseed oils. As this invention relates to the alkoxylation of these triglycerides, this group is restricted to those fats, fatty oils, and derivatives, which can undergo alkoxylation reactions via standard chemistries known in the art. Accordingly, this invention relates to fats, fatty oils, and derivatives possess reactive amine, hydroxyl, or acid moieties. As is known in the art, the alkoxylation adducts produced in this manner are likely mixtures including fully etherified oil, partially etherified oil and unattached polyether. Such mixtures are suitably employed in the invention without isolation or purification of component species. A common fatty oil appropriate for practicing the invention is castor oil. A ring-opened, epoxidized derivative of an oil such as soybean oil would also fit this description. This latter material would be prepared from soybean oil in multiple reaction steps: typically an epoxidation reaction followed by a hydrolysis step followed by alkoxylation. Preferred alkoxylation adduct products are EO started.

The optional adduct species (2) includes one or more adducts from the following including mixtures: a polyoxyalkylene monol, which is derived from reactions of small molecules containing alcohol, amine, or acid functionality including mixtures with oxyethylene, oxypropylene, oxybutylene, or tetrahydrofuran mixtures thereof; a capped polyoxyalkylene monol, or polyol, adduct; or a fatty oil including triglycerides and alkoxylated triglycerides and capped versions of these, other than as defined for adduct species (1) above.

The capped species of this invention include adducts terminated with capping groups of acetoxy, methyl ether or ethyl ether. For this subgroup of structures the reactive hydroxyl groups of the alkoxylated triglyceride typically are substantially capped making them unreactive to isocyanate groups. These capping reactions typically are performed via reaction of hydroxyl groups with acetic anhydride, acetyl chloride, and methyl chloride, and the like.

The compatibilizing agent adduct (1), or the adduct mixture comprising adduct (1), is used in amounts from 0.1 to 10 parts per 100 parts of polyol by weight in the foam formulations of this invention, preferably from about 1.0 to 2.5 parts. The weight percent of the component (1) in the adduct mixtures including optional component (2) is 10 to 100%, preferably 25 to 100%, and most preferably 50 to 100%. The effectiveness of a particular amount of compatibilizing agent adduct or mixture will vary according to the composition of adducts (1) and adduct (2), if employed, the relative ratio, and the particularities of the remaining components of the foam system.

In making polyurethane foam, the polyol(s), polyisocyanate, compatibilizer and other components are contacted, thoroughly mixed, and permitted to expand and cure into a cellular polymer. The particular mixing apparatus is not critical, and various types of mixing head and spray apparatus are conventionally used. It is often convenient, but not necessary, to preblend certain of the raw materials prior to reacting the polyisocyanate with the active hydrogen-containing components. For example, it is often useful to blend the polyol(s), blowing agent, compatibilizer, surfactants, catalysts, and other components except for the polyisocyanate. Alternatively, all components can be introduced individually to the mixing zone where the polyisocyanate and polyol(s) are contacted. It is also possible to pre-react all or a portion of the polyol(s) with the polyisocyanate to from a prepolymer, although such is not preferred.

The polyurethane foam obtained in accordance with this invention is of value for the appliance and construction industry where its attractive compression strength, dimensional stability, and thermal insulation are highly desirable.

The invention may also be used to provide polyurethane foam for semirigid applications such as for sealant foam applications.

The invention is illustrated by way of the examples given herein below, which are not to be considered as limiting the scope of the invention. Unless otherwise indicated all amounts given designate parts by weight. The designation "pphp" refers to parts per 100 parts of polyol by weight.

EXAMPLES 1–15

Emulsion Stability Study Using Single Species Adducts

The following mixture was blended with the noted hydrocarbon blowing agent at various levels to test the emulsion stability characteristics of a generic foam formulation (excluding isocyanate) in the presence of various amounts of various types of compatibilizer additives.

|  | Parts |
|---|---|
| polyol | 100 |
| FR additive | 10 |
| trimerization catalyst | 2.68 |
| amine catalyst | 0.32 |
| water | 0.5 |
| hydrocarbon | varied |
| compatibilizer additive | varied |

The polyol used was Stepanpol ® PS2402 from Stepan Company. The hydrocarbon was Exxsol ® from Exxon Chemical Company. The fire retardant (FR) additive was Antiblaze 80 from Albright and Wilson Americas. The trimerization catalyst was potassium octoate. The amine catalyst was Niax ® Catalyst C-5 from CK Witco Corporation.

Each sample was prepared by weighing the components into a small vial, shaking it vigorously by hand, then mechanically mixing it until homogeneous, typically about 90 seconds, using a hand-made mix blade attached to a small hand drill. The sample was then allowed to sit undisturbed at room temperature prior to observation after 7 days. Each emulsion sample was then graded according to the following definitions of appearance:

Stable Emulsion: Clear to milky white emulsion, uniform in appearance throughout, a single homogeneous bulk phase Separated Phases: Obvious multiple bulk phases present, typically a clear hydrocarbon-rich layer separating out of the bulk emulsion top surface Table 1 details the emulsion stability data for a number of compatibilizer additives based on polyoxyethylene adducts of the triglyceride castor oil. This table summarizes the maximum weight percent of hydrocarbon that remained as stable emulsions when blended with the noted amounts of specific compatibilizer additives according to the above procedure.

These data clearly show the large unexpected improvement in emulsion stability of hydrocarbon based foam mixtures in the presence of polyoxyethylene adducts of castor oil when the weight percent of ethylene oxide (EO) is greater than about 60.

TABLE 1

Maximum weight percent of hydrocarbon which produced stable emulsions for numerous types and amounts of compatibilizer

| Ex. No. | Avg. number of moles EO per castor oil molecule | hydroxyl number of adduct | weight percent EO | 5 pphp | 3 pphp | 2 pphp | 1.5 pphp | 1 pphp | 0.5 pphp |
|---|---|---|---|---|---|---|---|---|---|
| 1 | 5 | 135 | 18.0 | <23 | <23 | <23 | <23 | <23 | <23 |
| 2 | 10 | 120 | 30.5 | <23 | <23 | <23 | <23 | <23 | <23 |
| 3 | 18 | 100 | 44.1 | <23 | <23 | <23 | <23 | <23 | <23 |
| 4 | 30 | 75 | 56.8 | <23 | <23 | <23 | <23 | <23 | <23 |
| 5 | 36 | 65 | 61.3 | 47 | 43 | 35 | 35 | 23 | <23 |
| 6 | 45 | 54 | 66.4 | 43 | 31 | <23 | <23 | <23 | <23 |

Table 2 shows the influence of the number of ethylene oxide units for various castor oil started alkylene oxide copolymer structures started with castor oil. In contrast to Table 1, these stabilities were examined after 1 day. With specific copolymer architectures, enhanced emulsion stability was observed for adducts comprised of greater than about 52 weight percent ethylene oxide.

TABLE 2

Maximum weight percent of hydrocarbon which produced stable emulsions for numerous types of compatibilizer with different alkoxylate architecture

| Ex. No. | Avg. number of moles EO per castor oil molecule | Weight percent | Structure type* | 5 pphp | 2 pphp |
|---|---|---|---|---|---|
| 7 | 30 | 47.8 | a | <31 | <31 |
| 8 | 34 | 49.9 | a | <31 | <31 |
| 9 | 38 | 51.7 | a | <31 | <31 |
| 10 | 30 | 52.8 | b | >43 | >39 |
| 11 | 34 | 54.7 | b | >43 | >43 |
| 12 | 38 | 56.3 | b | >43 | >35 |
| 13 | 18 | 30.5 | c | <23 | <23 |
| 14 | 18 | 28.3 | c | <23 | <23 |
| 15 | 18 | 26.5 | c | <23 | <23 |

*as multiple arms extended from a castor oil base:
a random polyethylene glycol-co-polypropylene glycol copolymer containing 75 weight percent polyethylene glycol, TABLE 2-continued Maximum weight percent of hydrocarbon which produced stable emulsions for numerous types of compatibilizer with different alkoxylate architecture

| Ex. No. | Avg. number of moles EO per castor oil molecule | Weight percent | Structure type* | 5 pphp | 2 pphp |
|---|---|---|---|---|---| b as mixture of blocky copolymer arms with the average starter of 6 moles of EO grown from the castor oil center per arm followed by random polyethylene glycol-co-polypropylene glycol copolymer containing 75 weight percent polyethylene glycol.
c as mixture of blocky copolymer arms with the average starter of 6 moles of EO grown from the castor oil center per arm followed pure polypropylene glycol for an average MW per arm of 800, 1000, and 1200 respectively.

EXAMPLES 16–34

Solubility Stability Study of Adduct Blends

The following materials were blended with the 36 mole ethoxylate of castor oil in the ratios shown prior to use as compatibilizing agents in the formulation given in example 1. The characteristics of emulsion stability of mixtures incorporating these materials were measured in a similar manner to Table 2 with emulsion stability readings taken after 24 hours.

TABLE 3

Stability of emulsions prepared from numerous types and amounts of compatibilizer blends (○ designates stable, X = separated)

| Ex. No. | co-additive description (capping group[a]) | component ratio[b] | total pphp of compatibilizer additive | 23 pphp of hydrocarbon | 27 pphp of hydrocarbon | 31 pphp of hydrocarbon |
|---|---|---|---|---|---|---|
| 16 | APEG-350 (OH) | 75:25 | 5.0 | ○ | ○ | ○ |
| 17 | APEG-350 (OH) | 50:50 | 5.0 | ○ | ○ | ○ |
| 18 | APEG-350 (OH) | 25:75 | 5.0 | ○ | ○ | ○ |
| 19 | APEG-350 (OMe) | 75:25 | 5.0 | ○ | ○ | ○ |
| 20 | APEG-350 (OMe) | 50:50 | 5.0 | ○ | ○ | ○ |
| 21 | APEG-350 (OMe) | 25:75 | 5.0 | ○ | ○ | ○ |
| 22 | Castor Oil | 75:25 | 5.0 | ○ | ○ | ○ |
| 23 | Castor Oil | 50:50 | 5.0 | ○ | ○ | ○ |
| 24 | Castor Oil | 25:75 | 5.0 | ○ | ○ | ○ |
| 25 | APEG-350 (OH) | 75:25 | 2.0 | X | X | X |
| 26 | APEG-350 (OH) | 25:75 | 2.0 | ○ | ○ | X |
| 27 | APEG-350 (OMe) | 75:25 | 2.0 | X | X | X |
| 28 | APEG-350 (OMe) | 25:75 | 2.0 | ○ | ○ | X |
| 29 | Castor Oil | 75:25 | 2.0 | X | X | X |
| 30 | Castor Oil | 25:75 | 2.0 | ○ | ○ | X |

TABLE 3-continued

Stability of emulsions prepared from numerous types and amounts of compatibilizer blends (○ designates stable, X = separated)

| Ex. No. | co-additive description (capping group[a)] | component ratio[b] | total pphp of compatibilizer additive | 23 pphp of hydrocarbon | 27 pphp of hydrocarbon | 31 pphp of hydrocarbon |
|---|---|---|---|---|---|---|
| 31 | APEG-350 (OMe) | 75:25 | 2.0 | X | X | X |
| 32 | APEG-350 (OMe) | 25:75 | 2.0 | ○ | ○ | X |
| 33 | Castor Oil | 75:25 | 2.0 | X | X | X |
| 34 | Castor Oil | 25:75 | 2.0 | ○ | ○ | X |

*APEG-350 (OH) designates an allyl started polyoxyethylene monol of around 350 molecular weight with a hydroxyl end group. APEG-350 (OMe) is a methyl ether capped APEG-350.
**weight ratio of co-additive to 36 mole ethoxylate of castor oil.

The results in Table 3 clearly show how various mixtures of additives are also effective hydrocarbon compatibilizers if they include the 36 mole ethylene oxide adduct of castor oil. Not all of the mixtures are equally effective as compatibilizers, particularly at the lower use levels.

EXAMPLES 35–36

Manufacture of Polyurethane Foam

Foam Preparation

A premix of polyol, surfactant, additive, catalyst and blowing agent are prepared in a large container. This premixed solution of B component and the isocyanate or A component, were placed in a temperature controlled water bath. The materials were allowed to come to an equilibrium temperature of 20° C. The A and B materials are pre-weighed into paper cups. The materials are then ready to be combined in a mixing sequence for each foam using a Dayton 3500 rpm motor with a Conn 2 inch double blade. The B component was mixed for 4 seconds, followed by pouring the A material for 3 seconds. The mixed components were then mixed for 5 seconds.

Immediately after mixing stops, the blended material is poured into an isothermal mold at 120° F. The amount of material charged into the mold is determined to be 10 percent greater that the amount of foam to fully fill the mold (minimum fill). The material is allowed to cure for 15 minutes and then removed from the mold. Physical properties are tested within 12 to 24 hours.

The following formulation was used to compare the performance a typical hydrocarbon blown polyisocyanurate foam formulation for systems without and with the compatibilizer additive.

TABLE 4

| Supplier | Product | Material | Ex. 35 Amount (A) | Ex. 36 Amount (B) |
|---|---|---|---|---|
| Stepan Company | Stepanpol® PS-2352 | Polyester Polyol (235 OH#) | 100.00 | 100.00 |
| Albright & Wilson | Antiblaze® 80 | Tris (chloropropyl) Phosphate | 10.00 | 10.00 |
| Mooney Chemical | Hexchem® 977 | Potassium Octoate | 2.52 | 2.52 |
| CK Witco | Niax® DMEA | Dimethylethanolamine | 0.40 | 0.40 |
| CK Witco | Niax® Y-10816 | Silicone Surfactant | 1.25 | 1.00 |
| CK Witco | Witconol® CO-360 | Castor Oil 36 mole ethoxylate | 0.00 | 1.50 |
| Exxon | Exxsol® | Hydrocarbon | 26.39 | 26.39 |

TABLE 4-continued

| Supplier | Product | Material | Ex. 35 Amount (A) | Ex. 36 Amount (B) |
|---|---|---|---|---|
| | 2000 | Blowing Agent (80% cyclopentane/20% Isopentane) | | |
| Bayer | Mondur® 489 | Total Isocyanate (2.9 NCO Functional) | 140.56 | 141.81 |
| | | Iso EW | 137.70 | 137.70 |
| | | Index | 307.00 | 307.00 |

The physical properties of the foams were tested under typical conditions:
  Anacon K Factor—75° F. mean temperature BTU·In./Ft$^{2}$·° F.·Hr.
  Compressive Strength Zwick—10% deformation ponds per square inch (psi)
  Dimensional Stability—Volume change as a percentage of original volume
    Cold Age –30° C. 7 days
    Humid Age –70° C. 95% relative humidity, 7 days
  Flow Index—Isothermal polyethylene lined tubes 180 cm×6 cm: flow length (cm)/weight of foam (g).

The results of these tests are shown in Table 5

TABLE 5

| Physical Properties | Ex. 35 Avg. | Ex. 36 Avg. |
|---|---|---|
| Density, pcf | | |
| Total | 2.32 | 2.32 |
| Core | 2.22 | 2.23 |
| K-factor | 0.158 | 0.157 |
| Compressive Strength | | |
| Parallel | 28.90 | 34.47 |
| Perpendicular | 17.71 | 19.41 |
| Isotropy | 0.61 | 0.56 |
| Dimensional Stability | | |
| Cold Age | –0.77 | –0.78 |
| Humid Age | 2.36 | 1.52 |
| Flow index | 0.78 | 0.77 |

These data show no detrimental effects on the foam physical properties.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

We claim:

1. A composition produced by mixing a polyol component, a polyisocyanate component, and a blowing component comprising a hydrocarbon blowing agent, said components selected to produce a rigid polyurethane foam on reaction of the polyol and polyisocyanate components, wherein the composition further comprises: a compatibilizer component for the blowing agent, the compatibilizer component comprising an alkoxylated triglyceride adduct (1) having a hydroxyl value of less than 90 and an ethylene oxide content of at least 40% by weight thereof, and the compatibilizer component is present in said composition in an amount of from 0.1 to 5 parts per hundred parts by weight of the polyol component.

2. A composition as in claim 1 wherein the ethylene oxide content of the alkoxylated triglyceride adduct (1) is greater than 50% by weight thereof.

3. A composition as in claim 1 wherein the alkoxylated triglyceride adduct (1) is an alkoxylate of:

linseed, perilla, tung, safflower, soybean, castor, coconut, or cottonseed oil in a derivative thereof, said derivative thereof possessing reactive amine, hydroxyl, or acid moieties.

4. A composition as in claim 1 wherein the ethylene oxide content of the alkoxylated triglyceride adduct (1) is greater than 60 weight percent thereof and the hydroxyl value thereof is less than 90.

5. A composition as in claim 4 wherein the alkoxylated triglyceride adduct (1) is an alkoxylated castor oil.

6. A composition as in claim 1 wherein the alkoxylated triglyceride adduct (1) is capped with acetoxy, methyl ether or ethyl ether groups.

7. A composition as in claim 1 wherein the compatibilizer component further comprises one or more adduct species (2) selected from the group consisting of polyoxyalkylene monols, capped polyoxyalkylene adducts, and fatty oils other than said alkoxylated triglyceride adduct (1).

8. A composition as in claim 1 wherein the alkoxylated triglyceride adduct (1) is present in the compatibilizer component in an amount of 10–100% by weight thereof.

9. A composition as in claim 8 wherein said alkoxylated triglyceride adduct (1) is present in the compatibilizer component in an amount of 25–100% by weight thereof.

10. A composition as in claim 1 wherein said hydrocarbon blowing agent includes at least one member selected from the group consisting of i-butane, n-butane, n-pentane, i-pentane, cyclopentane, methylcyclopentane, hexane, cyclohexane, methylcyclohexane and isomers thereof.

11. A composition as in claim 1 wherein said hydrocarbon blowing agent is present in the composition in a weight basis amount of at least 30 parts per hundred parts of said polyol component.

12. A composition as in claim 1 wherein the alkoxylated triglyceride adduct (1) has an ethylene oxide content of greater than 60% by weight thereof and a hydroxyl number of about 75 or less.

13. A composition as in claim 1 wherein the compatibilizer component is present in the composition in an amount of from 1 to 5 parts per hundred parts of said polyol component.

14. A composition as in claim 13 wherein the compatibilizer component is present in the composition in an amount of from 1 to 2.5 parts per hundred parts of said polyol component.

15. A cured polyurethane foam produced from a composition as in claim 1.

16. A method for preparing a rigid polyurethane foam by blowing a mixture of a polyol component, a polyisocyanate component, and a blowing component comprising a hydrocarbon blowing agent, the method comprising including in said mixture a compatibilizer component for the blowing agent in an amount of from 0.1 to 5 parts per hundred parts by weight of said polyol component, the compatibilizer component comprising an alkoxylated triglyceride adduct (1) with a hydroxyl value of less than 90, said alkoxylated triglyceride adduct having an ethylene oxide content of at least 40% by weight thereof and said alkoxylated triglyceride adduct being present in an amount of from 10 to 100% by weight of said compatibilizer component.

17. A method as in claim 16 wherein the compatibilizer component is included in the composition in an amount of from 1 to 5 parts per hundred parts of said polyol component.

18. A method as in claim 17 wherein the compatibilizer component is included in the composition in an amount of from 1 to 2.5 parts per hundred parts of said polyol component.

19. A composition produced by mixing a polyol component, a polyisocyanate component, and a blowing component comprising a hydrocarbon blowing agent, said components selected to produce a rigid polyurethane foam on reaction of the polyol and polyisocyanate components, the composition further comprising a compatibilizer component for the blowing agent, the compatibilizer component being present in said composition in an amount of from 0.1 to 5 parts per hundred parts by weight of the polyol component, said compatibilizer component comprising an alkoxylated triglyceride adduct (1) having a hydroxyl value of less than 90 and an ethylene oxide content of at least 40% by weight thereof, the compatibilizer component being further characterized by at least one of the following conditions (a) and (b), wherein:

(a) is that said alkoxylated triglyceride adduct (1) is capped with acetoxy, methyl ether or ethyl ether groups, and (b) is that the compatibilizer component further comprises one or more adduct species (2) selected from the group consisting of polyoxyalkylene monols, capped polyoxyalkylene adducts, and fatty oils other than said alkoxylated triglyceride adduct (1).

* * * * *